United States Patent [19]

Perry

[11] Patent Number: 5,376,262
[45] Date of Patent: Dec. 27, 1994

[54] CONCENTRATION AND/DISPOSAL OF NON-VOLATILE INORGANIC CONTAMINANTS FROM REFINERY WASTE WATER STREAMS

[75] Inventor: David P. Perry, Benicia, Calif.

[73] Assignee: Exxon Research and Engineering Company, Florham Park, N.J.

[21] Appl. No.: 73,858

[22] Filed: Jun. 8, 1993

[51] Int. Cl.$^5$ ............................................. B01D 61/00
[52] U.S. Cl. ................................... 210/651; 210/652; 210/694; 210/180; 159/47.3; 201/39
[58] Field of Search ............... 210/651, 652, 688, 911, 210/912, 688, 754, 717, 695, 257.1, 180, 694; 427/228; 423/510, 655; 203/10; 201/39; 159/47.3

[56] References Cited

U.S. PATENT DOCUMENTS

| | | | |
|---|---|---|---|
| 3,912,578 | 10/1975 | Didycz et al. | 159/47.3 |
| 4,014,787 | 3/1977 | Shorr | 210/651 |
| 4,405,464 | 9/1983 | Baldwin et al. | 210/717 |
| 4,695,447 | 9/1987 | Shultz | 423/659 |
| 4,725,357 | 2/1988 | Dowing et al. | 210/912 |
| 4,767,527 | 8/1988 | Iniotakis et al. | 210/180 |
| 4,781,944 | 11/1988 | Jones | 427/228 |
| 4,915,928 | 4/1990 | Marcantonio | 423/510 |
| 4,940,549 | 7/1990 | Olsen et al. | 210/695 |
| 5,071,568 | 12/1991 | Bennett et al. | 210/754 |
| 5,087,372 | 2/1992 | Toyomoto et al. | 210/651 |
| 5,092,998 | 3/1992 | Satoh | 210/257.1 |

FOREIGN PATENT DOCUMENTS 9208770 5/1992 WIPO .

OTHER PUBLICATIONS

"Removal of Selenium From Petroleum Refinery Wastewater" Gerhardt, et al., AIChE Summer National Meeting, Aug. 1992.
"Promising Water Technology" Rule, Contra Costa Times, Jan. 26, 1993.
"Field Evaluation of Arsenic and Selenium Removal by Iron Coprecipitation" Merrill et al, Environmental Progress vol. 6 No. 2 May 1987 pp. 82–90.
"Membrane Methods of Separating Solutions and Possible Applications in Coke-Chemical Manufacture" Dytnerskii, Yu I., et al. Koks Khim, 1976 (9) 36–8.

Primary Examiner—Robert A. Dawson
Assistant Examiner—Ana M. Fortuna
Attorney, Agent, or Firm—Joseph J. Allocca

[57] ABSTRACT

Selenium and other non-volatile inorganic contaminants in refinery waste water are removed from said waste water and disposed of by a process comprising subjecting the contaminated waste water stream to a nonchemical concentration process producing a contaminants concentrate stream and a clean water stream and passing the contaminants concentrate stream to a coker unit wherein it is used as coker elutriant to quench the coke.

5 Claims, 3 Drawing Sheets

CONCENTRATION AND/DISPOSAL OF NON-VOLATILE INORGANIC CONTAMINANTS FROM REFINERY WASTE WATER STREAMS

BACKGROUND OF THE INVENTION

1. Field of the Invention

The present invention relates to reducing the non-volatile inorganic contaminant content of refinery waste water discharged to the environment. More particularly it relates to a process whereby selenium is removed from the waste water and concentrated and the selenium concentrate is disposed of in an environmentally responsible manner.

2. Description of the Prior Art

Selenium in waste water streams is recognized as a biological and health hazard and limits have been imposed on the amount of selenium which may be discharged into receiving bodies of water.

Because selenium is a component of refinery waste water, being a natural constituent of the crude oil refined, the restriction on the amount of selenium which may be discharged into receiving bodies of water necessarily acts as a restriction on how such refinery waste water streams can be handled and where and how they can be disposed and can influence the entire refining process.

Various techniques have been considered as a means for removing selenium from waste water streams.

Selenium can be removed from waste water streams, such as those associated with power plants, by iron coprecipitation. In that process a ferric iron salt is added to the waste water and a precipitate of ferric hydroxide is produced through the adjustment of the pH. The ferric hydroxide comes together as a flock like precipitate which adsorbs contaminants in the waste water on its surface. By careful control of the pH the selenium can be removed from the waste water. The treated waste water is sent to a settler and separated into clean water and a sludge containing the contaminants. Due to its high contaminants content (selenium and other metals etc.) the sludge is a hazardous waste and its disposal is regulated. Further, a very large volume of sludge is produced for the amount of contaminants removed.

Selenium can also be removed from waste water by contacting with elemental iron at low pH which converts the selenium compounds in the waste water into elemental selenium which is retained in the elemental iron. See U.S. Pat. No. 4,405,464 and U.S. Pat. No. 4,940,549. This process also produces a selenium containing sludge which poses disposal problems.

While evaporation is commonly used to concentrate inorganics in water streams, an issue exists as to what to do with the inorganics concentrate. Because refinery waste water streams contain many varied inorganic materials, evaporation practiced to concentrate the selenium would produce a concentrate stream containing large amounts of co-concentrated inorganics which would, again, constitute a disposal and handling problem.

It would be an advantage if selenium and other harmful, environmentally objectionable non-volatile inorganic materials could be removed from refinery waste water streams, so as to minimize sludge and contaminant concentrate handling problems and be disposed of in an environmentally responsible way.

DESCRIPTION OF THE INVENTION

Waste water streams preferably refinery waste water streams contaminated with environmentally objectionable concentrations of selenium compounds and other non-volatile inorganic compounds are treated so as to reduce the concentration of selenium and other inorganic compounds therein by a process comprising subjecting the contaminated waste water stream to a non-chemical process whereby the contaminants are concentrated in a concentrated stream and clean water is produced as a product stream, passing the concentrate stream to a coke quencher wherein the concentrate stream is used as coker quench, the contaminants in the concentrate stream being deposited on the quenched coke.

The non-chemical concentration process can be reverse osmosis wherein the waste water stream is contacted with one face of a selective separation membrane under elevated pressure sufficient to overcome the osmotic pressure to thereby produce a permeate of clean water of reduced selenium and other inorganic compound concentration and a retentate of elevated selenium and other inorganic compound concentration as a contaminants concentrate. The membrane separation reverse osmosis process practiced will be the same as that practiced for water desalination. Thus, membranes useful for water desalination such as regenerated cellulose, cellulose esters, cellulose ethers and mixtures thereof, polyamid as well as any other of the membranes found useful for water desalination can be used. Reverse osmosis is practiced by applying a pressure along the feed side of the membrane sufficient to overcome the osmotic pressure. Pressure in the range of 100 to 800 psi can be used, but usually the pressure applied is in the 100 to 600 psi range. The membranes are used in elements of either the spiral wound or hollow fiber configuration.

The non-chemical concentration process can also take the form of evaporation or steam generation. The waste water stream is heated in a dedicated boiler or in a heat exchanger utilizing waste heat (such as a steam evaporator). The hot waste water is flashed wherein clean steam is vented as overheads and used elsewhere in the refinery where clean steam is required, or cooled for disposal. The bottoms from the flash vessel are recovered as a contaminants concentrate.

This contaminants concentrate, whether it is from the evaporator or steam generator or the retentate from the reverse osmosis unit is sent to the coker as coker quench. The selenium compounds in the contaminants concentrate will remain in the coke.

Waste water streams which contain selenium and other inorganic compounds are generated at various locations in the refinery; they are all eventually gathered at the sour water stripper where the volatile forms of selenium as well as ammonia and $H_2S$ etc. are removed. Selenium contamination of water streams may occur any time an aqueous stream contacts a selenium containing oil stream. Selenium is most often present in high concentrations in steam condensate streams, where the steam was in contact with the oil and "stripped" the selenium out of the oil stream. The selenium then remains in the condensed water stream. As previously stated in refinery operations the selenium containing streams are gathered at the sour water stripper. Actual stripping of the water before being treated by the present invention is not necessary, but is preferred. When contaminant concentration takes the form of steam generation or reverse osmosis, the waste water stream can preferably be subjected to various filtering, neutralizing and softening procedures known in the art prior to the practice of the steam generation or reverse osmosis concentration step. Such pretreatment removes constituents in the waste water known to be harmful to steam generator equipment or reverse osmosis membrane. If the stream contains a significant quantity of $H_2S$ and volatile forms of selenium, a stripping step is recommended to prevent these volatile materials from escaping into the atmosphere when evaporation is practiced as the concentration step.

It has been discovered that an evaporation process can be employed in treating the waste water stream because the selenium in sour water stripper waste water is primarily in the non-volatile form. Most of the volatile forms of selenium have been removed during the stripping process.

Evaporation permits concentration of the non-volatile selenium compounds in the bottom fraction from the evaporator. Any degree of evaporation and concentration can be practiced, the object being to reduce the overall volume of contaminated waste water through the production of a separate clean water stream. It has been found that over 97% of the selenium compounds in the waste water are concentrated in the liquid concentrate stream when the waste water is concentrated at a 7:1 concentration ratio. Thus, a concentration ratio in the range of about 2:1 to 15:1 or more preferably about 2:1 to 50:1 or more, most preferably about 2:1 to 100:1 or more will be typical, depending of course on the volume of waste water, the concentration of contaminants on the waste water, and the coker quench water requirements. It would, of course, be desirable to produce as concentrated a stream as possible of the lowest volume so as to maximize clean steam/water production.

The selenium concentrate stream is used as coke quench and can replace all or part of the currently used coke quench and thus, may have the added benefit of replacing a contaminated stream currently used for that service, such as a sour water stream. The selenium in the contaminants concentrate used as coke quench becomes attached to the coke and will not volatize when the contaminants concentrate contacts the hot coke from the coker. Coke from any type of coker source can be quenched by this process. The concentration step is preferably adjusted to result in the production of a contaminants concentrate stream of just sufficient volume to satisfy the coke quench requirements of the coke plant. Replacement of a sour water coke quench stream by a selenium contaminant stream has the added benefit of reducing the total $SO_x$ released to the main refinery stack. Thus, the present invention acts to reduce two environmentally objectionable contaminants.

DETAILED DESCRIPTION OF DRAWINGS

Figure 1:
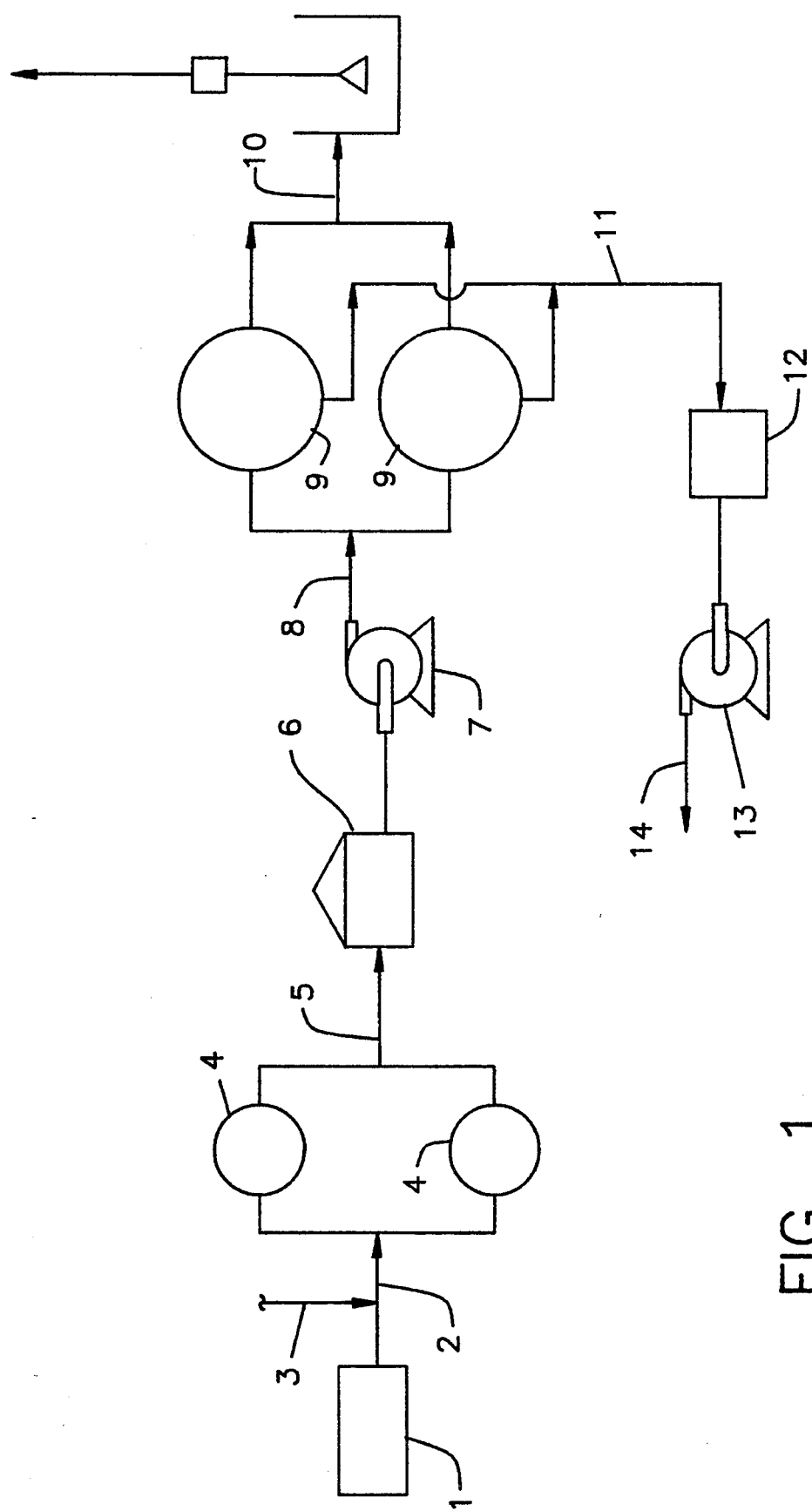
FIG. 1 presents a schematic of the present invention wherein the method of concentrating the contaminated waste water stream is evaporation.

FIG. 1 presents one embodiment of the process wherein waste water from the sour water stripper (1) is fed via line (2) to filters (4) charged with any appropriate filtering media for solids/oil removal such as walnut media or anthracite/garnet. The pH of the sour water in line (2) is adjusted to about 7-8 by the addition of acid (e.g., sulfuric acid) via line (3). The filtrate from filters (4) is fed via line 5 to a surge holding tank either under $N_2$ atmosphere or pressurized wherein the water is also permitted to stand and any insoluble particulate matter settles out. Filtered water from tank (6) is fed via pump (7) and line (8) to brine concentrators (9) wherein any convenient technique such as vapor compressors, steam, etc. can be used to cause the evaporation. The vapor exchanges heat with incoming waste water and condenses to form product water which is recovered via line 10 and sent to clean water sump 10A and then via line 10b to consumers of clean water in the refinery or to discharge. Concentrated brine from the concentrators (9) is sent via line 11 to a storage tank (12) and then via pump (13) and line (14) to the coker as quench water.

Figure 2:
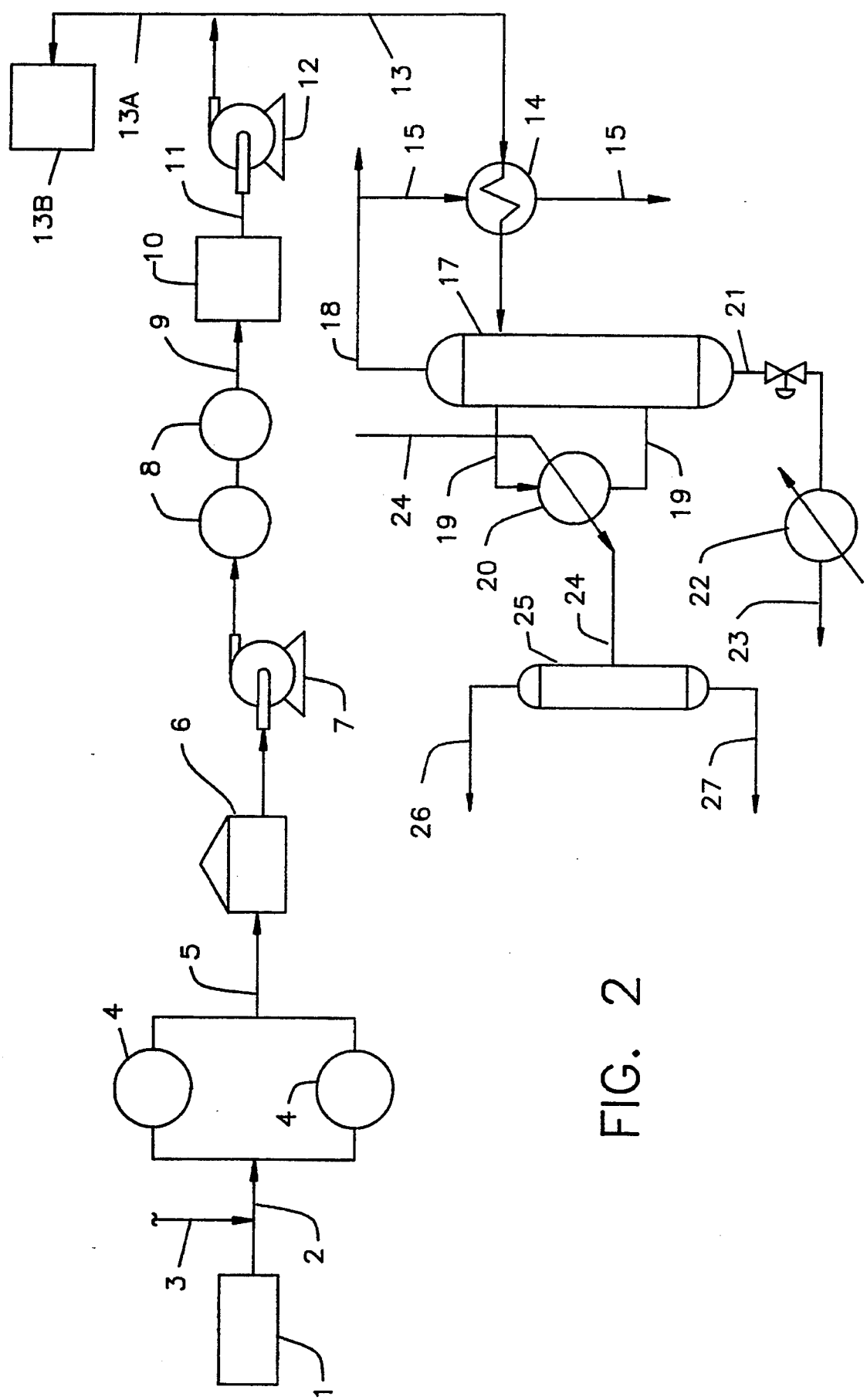
FIG. 2 presents a schematic of the present invention wherein the method of concentrating the contaminated waste water stream is steam generation.

FIG. 2 presents another embodiment wherein elements (1) through 7 are as described in FIG. 1. In FIG. 2 the filter water is sent via pump (7) to water softeners (8) wherein the sour water contacts e.g., a sodium zeolite softener. The softened water is sent via line 9 to a holding tank 10 which is either under a $N_2$ atmosphere or pressurized and then via line (11) to pump 12. Part of the softened sour water can be sent via line (13A) to the water softener regeneration facility (13B). Softened water is sent via line 13 to preheat exchanger 14 shown as powered by steam via lines 18 and 15 from the steam drum (17). Low pressure steam from heat exchanger 14 is fed via line 16 to steam drum 17. Steam drum 17 is powered by employing a side stream (19) from the steam drum 17 sent to heat exchanger 20 wherein the stream 19 is indirectly heated using high pressure steam (e.g., 600#) via line 24. This heated stream 19 is returned to steam drum 17 and provides the heat needed to generate the steam in steam drum 17. A sour steam overhead is recovered from steam drum 17 via line 18. The high pressure steam from exchanger 20 is sent via line (24) to flash drum (25) wherein low pressure steam is recovered via line (26) as overhead and condensate is recovered via line (27) and sent to a deaerator. Concentrated bottoms are recovered from steam drum (17) via line (21) cooled in exchanger (22) and sent via line 23 to the coker as coke quench water.

Figure 3:
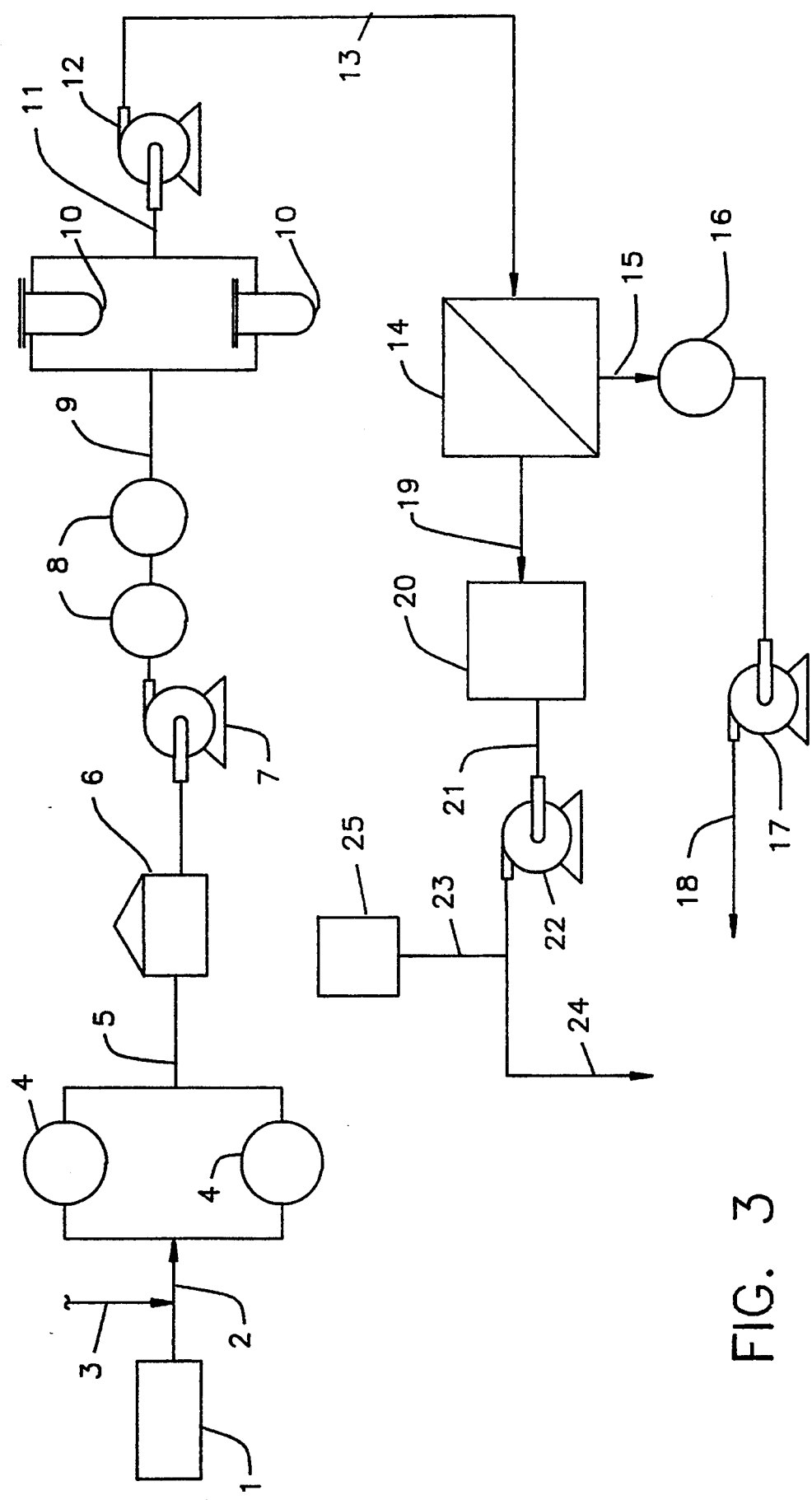
FIG. 3 presents a schematic of the present invention wherein the method for concentrating the contaminated waste stream is membrane separation.

FIG. 3 presents yet another embodiment of the present invention wherein again elements (1) through (7) are as described in FIG. 2. In FIG. 3 the softened water is sent via line (9) to cartridge filters (10) (e.g., 5 micron cartridge filter) wherein fine particulate matter is removed. The filtered water from 10 is sent via line 11, pump 12 and line 13 to the reverse osmosis membrane unit which produces a concentrate and high quality permeate. The concentrate is sent via line 15, hold up drum (16) pump (17) and line (18) to the coker for use as coke quench water. Clean water is recovered as permeate via line (18) and sent to water storage tank (20). Clean water is sent via line (21), pump (22) and line (24) to the consumers of clean water in the refinery or to discharge. A side stream via line 23 can be used in the softener regeneration facility (25).

The invention is demonstrated by reference to the following non-limiting examples.

EXAMPLE 1

Waste water samples from two sour water strippers and the coker liquid product fractionator overhead condensing drum were distilled to determine the selenium concentration levels in the distillation contaminants concentrate bottoms and the amount of selenium carried overhead in the steam. The results of the distillation of 200 and 300 ml samples are reported in Tables IA and B.

EXAMPLE 2

The various water streams of Example 1 containing varying amounts of selenium were employed as coke quench elutriant. The data in Table 2 indicates that coke retains substantially all of the selenium present in the selenium concentrate stream. The concentrated sour water stripper bottoms was produced by distillation to a 7:1 concentration ratio.

TABLE 1

Results of Selenium Distillation Test

| Wastewater Stream | Percent Distilled | Selenium Concentration, ppb | Approximate Volume, mL | Selenium Mass, μgrams | Overhead Concentration Se, ppb | Overhead Concentration S, ppm |
|---|---|---|---|---|---|---|
| Stripper bottoms | 0 | 939 | 200 | 188 | <0.2 | <0.5 |
|  | 25 | 1,182 | 150 | 187 | <0.2 | <0.5 |
|  | 50 | 1,760 | 100 | 198 | <0.2 | <0.5 |
|  | 75 | 3,257 | 50 | 204 | <0.2 | <0.5 |
| Stripper bottoms | 0 | 1,582 | 200 | 316 | <0.2 | <0.5 |
|  | 25 | 2,995 | 150 | 465 | <0.2 | <0.5 |
|  | 50 | 4,227 | 100 | 470 | <0.2 | <0.5 |
|  | 75 | 6,981 | 50 | 443 | <0.2 | <0.5 |
| Overheads | 0 | 845 | 200 | 169 | <0.2 | <0.5 |
|  | 25 | 1,162 | 150 | 183 | <0.2 | 1640 |
|  | 50 | 1,685 | 100 | 189 | <0.2 | 24 |
|  | 75 | 2,892 | 50 | 184 | <0.2 | 9 |
| Stripper bottoms | 0 | 1330 | 300 | 399 | <0.2 |  |
|  | 88 | 9250 | 45 | 416 | 20 |  |

TABLE 2

Selenium Balances in Tests of Applying Sour Water and Stripped Sour Water to Refinery Coke

|  | Sample | Se* Conc., ppb | Sample mass. grams | Selenium micrograms | Stream flow rate, Klb/day | Selenium mass rate, lb/day |
|---|---|---|---|---|---|---|
|  | Coker Fractionator overheads |  |  |  |  |  |
| Initial | Circulating coke | 621 | 24 | 14.9 | 2,600 | 1.6 |
|  | Overhead water | 735 | 5 | 3.7 | 540 | 0.4 |
|  | Total in | — | — | 18.6 | — | 2.0 |
| Final | Final coke | 862 | 24 | 20.7 | 2,600 | 2.2 |
|  | Sour water stripper bottoms |  |  |  |  |  |
| Initial | Circulating coke | 621 | 24 | 14.9 | 2,600 | 1.6 |
|  | Stripper bottoms | 2,512 | 5 | 12.6 | 540 | 1.4 |
|  | Total in | — | — | 27.5 | — | 3.0 |
| Final | Final coke | 1,400 | 24 | 33.6 | 2,600 | 3.6 |
|  | Concentrated sour water stripper bottoms |  |  |  |  |  |
| Initial | Circulating coke | 621 | 24 | 14.9 | 2,600 | 1.6 |
|  | Concentrated Stripper bottoms | 9,246 | 5 | 46.2 | 540 | 5.0 |
|  | Total in | — | — | 61.1 | — | 6.6 |
| Final | Final coke | 2,320 | 24 | 55.7 | 2,600 | 6.0 | ppb = parts per billion
lb/day = pounds per day
Klb/day = thousand pounds per day
*The variation is a result of the difficulty of accurately measuring selenium in sour water streams.

What is claimed is:

1. A method for reducing and disposing of the inorganic contaminants present in waste water streams, said method comprising treating the waste water stream by non-chemical means so as to concentrate the inorganic contaminants in a small volume as a contaminant concentrate and disposing of the contaminant concentrate by passing the contaminant concentrate to a coke quencher wherein the contaminant concentrate is used as coke quenching elutriant resulting in the contaminants in the concentrate stream being deposited on the quenched coke.

2. The method of claim 1 wherein the contaminant containing waste water stream is a refining waste water stream.

3. The method of claim 1 or 2 wherein the contaminant containing waste water stream is concentrated by means of a membrane reverse osmosis process which concentrates the inorganic contaminants in a retentate stream.

4. The method of claim 1 or 2 wherein the contaminant containing waste water stream is concentrated by being subjected to evaporation or steam generation.

5. The method of claim 1 or 2 wherein the contaminant containing waste water stream is concentrated by a factor in the range of about 2:1 to 100:1 and higher.

* * * * *